No. 832,308. PATENTED OCT. 2, 1906.
T. W. FLORY.
POWER TRANSMITTING MECHANISM.
APPLICATION FILED SEPT. 13, 1905.

2 SHEETS—SHEET 1.

WITNESSES.
Paul A Blair
Edna W Collins

INVENTOR.
THOMAS WASS FLORY.
By Howson and Howson
ATTORNEYS.

No. 832,308. PATENTED OCT. 2, 1906.
T. W. FLORY.
POWER TRANSMITTING MECHANISM.
APPLICATION FILED SEPT. 13, 1905.
2 SHEETS—SHEET 2.
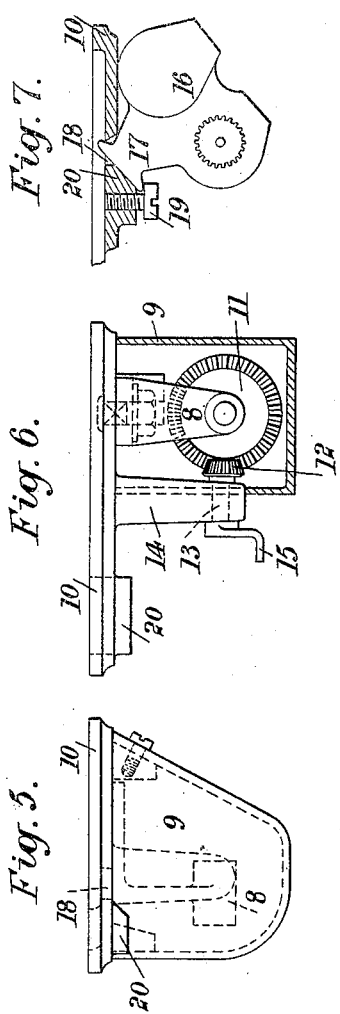
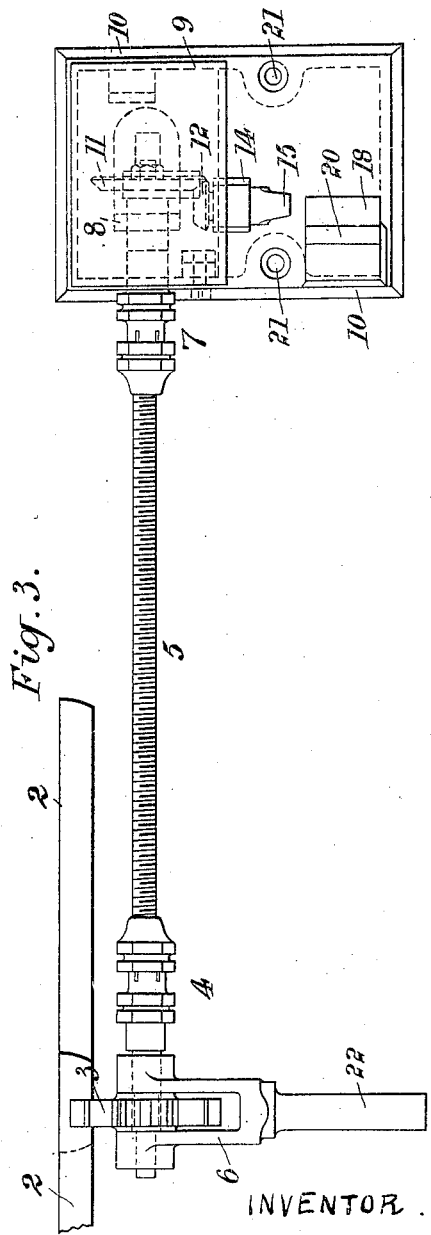
WITNESSES
Paul A. Blair.
Edna W. Collins
INVENTOR.
Thomas Wass Flory.
By Howson and Howson
ATTORNEYS.

UNITED STATES PATENT OFFICE.

THOMAS WASS FLORY, OF LONDON, ENGLAND.

POWER-TRANSMITTING MECHANISM.

No. 832,308.     Specification of Letters Patent.     Patented Oct. 2, 1906.

Application filed September 13, 1905. Serial No. 278,278.

*To all whom it may concern:*

Be it known that I, THOMAS WASS FLORY, a subject of the King of Great Britain and Ireland, residing at 108 Hatton Garden, in the city of London, England, have invented certain new and useful Improvements in Power-Transmitting Mechanism, of which the following is a specification.

My invention has for its object to provide mechanism for transmitting motion from rotating bodies to speed or revolution indicators, which mechanism is simple in construction, efficient in action, and not liable to readily get out of order, while it can be adapted with great readiness to any situation or position in which it is to be used.

The mechanism according to my invention is more especially intended for use for conveying motion from the wheels of motor-cars and other road vehicles to indicators of speed or of distance traveled, or both, and for the purposes of description I will presume that it is to be applied to a motor-car, this description also making it clear how the invention can be similarly applied to analogous purposes.

Figure 1:
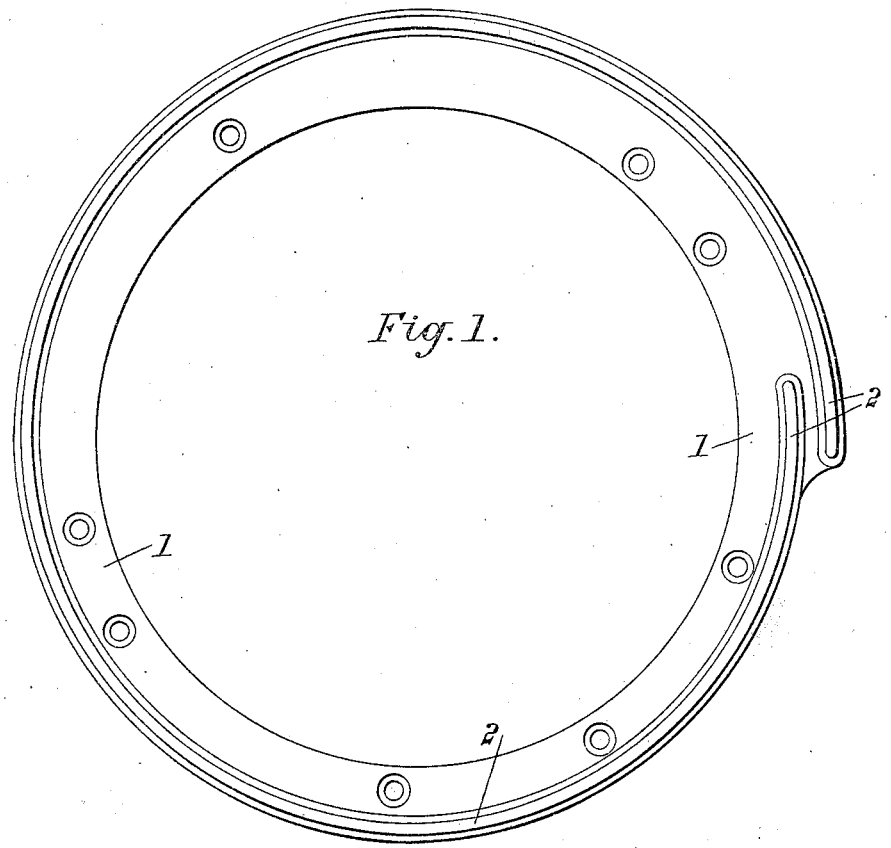
Figure 2:
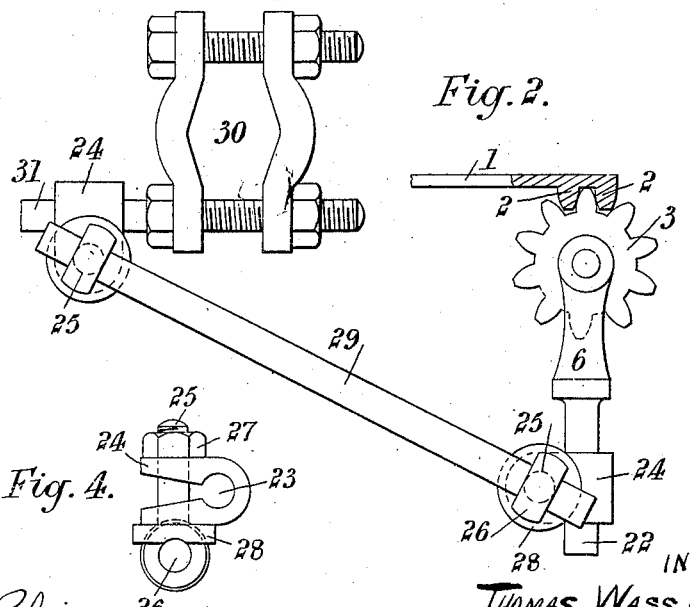
Figure 4:
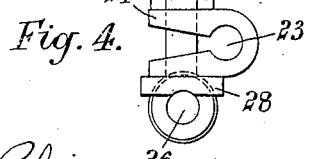

In the accompanying drawings, Figure 1 is an elevation of the transmitting-wheel. Fig. 2 is a plan view of a detail. Fig. 3 is a view at right angles to Fig. 2 of the shaft and gear by which the motion is conveyed to the speed or revolution indicator. Fig. 4 is a detail view. Figs. 5 and 6 are views in elevation at right angles to each other of the casing which contains the gear-wheels and the holder for the counter, the casing being shown in section in Fig. 6; and Fig. 7 is an elevation of a detail.

1 is an annular plate affixed to some convenient part of the wheel of the motor-car so that it is concentric therewith. The said plate 1 has on it a spiral tooth 2, extending only a little over one turn, so that it does not retain dirt, as it would do between its adjacent convolutions if two or more turns were used. The spiral tooth 2 is made in crosssection of a proper shape to engage with the teeth of a wheel 3, fixed to the end or end fitting 4 of the shaft 5, which may be a rigid or flexible shaft. The said end or end fitting 4 is carried in bearings in a forked piece 6, and the other end or end fitting 7 of the said shaft 5 is carried in a bearing 8 in the casing 9 on the base-plate 10, and this end has fixed to it a bevel-wheel 11, engaging with a bevel-pinion 12 on a shaft 13, mounted in a bearing-bracket 14, carried by the base-plate 10, the said shaft 13 having also fixed to it a cranked arm 15 for driving any driven member, such as the counter 16, which is supported by one of the projections on the part 17, engaging in the opening 18 in the base-plate 10, the other of the projections being pressed by a screw 19 against the bearing-surface at 20. The base-plate 10 is provided with screw-holes 21 or other means for affixing it to any suitable part of the car. The wheels 3, 11, and 12 can be changed to adapt the indications of the counter to any diameter of the car-wheels, and the bracket carrying the bearing 8 can be fixed by a slot and screw-bolt and nut attachment, so that it can be adjusted and fixed to suit variations in the sizes of the wheels 11 and 12. The length of shaft between the end fittings 4 and 7 can also be readily altered.

To allow of the fixing of the wheel 3 in any position and from any suitable part of the car, the following arrangement is used: The stem 22 of the forked carrier of the wheel 3 is received in an eye 23 in a spring split piece 24, through the split part of which passes a bolt 25 with an eye 26 at one end and a screw carrying a screw-nut 27 at the other end, there being a recessed washer 28 between the eye 26 of the bolt 25 and the side of the spring clip-piece 24. Through the said eye passes a rod 29. The clamp 30 or other means of attachment to the car has a stem 31. The connection of the stem 31 and the other end of the rod 29 is made by a split spring-piece 24 and screw-eyebolt 25 and nut like those described for connecting the stem 22 and rod 29, and the foregoing description applies to them also. It will be seen that the relative positions of the clamp 30 or the equivalent and the wheel 3 can be adjusted as required by sliding and turning the stems 22 and 31 in the eyes in the split pieces 24 and by sliding the rod 29 in the eyes 26 and turning the bolts 25 in the pieces 24, and the parts are firmly retained in their adjusted positions by screwing up the screw-nuts 27 on the bolts 25, the rod 29 being thus pinched between the inner sides of the eyes 26 and the recesses in the washers 28 and the stems 22 and 31 being pinched in the respective spring split pieces 24 by the split portions being forced nearer together, the screwing up of the said screw-nuts 27 thus holding firmly together each end of the rod 29 and the respective eyebolts, washers, spring split pieces, and stems.

I claim as my invention—

1. In combination with a driven member, mechanism for transmitting motion of the character described, comprising an annular driving-plate having a spiral tooth, a shaft, a wheel mounted at one end of the shaft and rotated by the said spiral tooth, the said driven wheel being adjustable and fixable in any required position, and means at the other end of the shaft for conveying motion to said driven member.

2. In combination with a casing and a driven mechanism therein, mechanism for transmitting motion of the character described to said driven mechanism, the said transmitting mechanism comprising a spiral driving-gear, a shaft rotated thereby, change gear-wheels 11 and 12 within the casing for operating the driven mechanism, and means for adjusting the bearing for the shaft in the casing to suit the change gear-wheels.

3. In combination with a driven member, mechanism of the character described for transmitting motion thereto, the said mechanism comprising an annular driving-plate having a single-turn spiral tooth, a shaft, a toothed wheel attached thereto at one end meshing with the spiral tooth, and supporting means for said shaft and wheel adjustable relatively to the driving-plate, and means at the other end of the shaft for operating said driven member.

In testimony whereof I have signed this specification in the presence of two subscribing witnesses.

THOMAS WASS FLORY.

Witnesses:
GILBERT DORMPUT,
H. D. JAMESON.